United States Patent
Aoki et al.

[11] 4,054,559
[45] Oct. 18, 1977

[54] REACTIVE DISAZO MONOHALOGENOTRIAZINE DYESTUFFS

[75] Inventors: Kisuke Aoki, Tokyo; Teruhito Sotogoshi; Masahiro Hiraki, both of Yono, all of Japan

[73] Assignee: Nippon Kayaku Kabushiki Kaisha, Tokyo, Japan

[21] Appl. No.: 541,770

[22] Filed: Jan. 17, 1975

[30] Foreign Application Priority Data

Jan. 17, 1974 Japan .................. 49-8032

[51] Int. Cl.² .............. C09B 45/42; C09B 62/08; D06P 1/10; D06P 1/382
[52] U.S. Cl. .................. 260/146 T; 260/148; 544/190
[58] Field of Search .............. 260/146 T, 153

[56] References Cited

U.S. PATENT DOCUMENTS

| | | | |
|---|---|---|---|
| 2,860,128 | 11/1958 | Gunst | 260/153 |
| 2,891,941 | 6/1959 | Fasciati | 260/153 |
| 2,938,895 | 5/1960 | Obsterlein | 260/146 T |
| 2,993,038 | 7/1961 | Fasciati et al. | 260/153 |
| 3,125,562 | 3/1964 | Ammann et al. | 260/146 T |
| 3,361,734 | 1/1968 | Schweizer | 260/147 |

FOREIGN PATENT DOCUMENTS

1,156,916  11/1963  Germany .................. 260/146 T

*Primary Examiner*—Floyd D. Higel
*Attorney, Agent, or Firm*—Oblon, Fisher, Spivak, McClelland & Maier

[57] ABSTRACT

Reactive disazo dyestuffs of the following formula are disclosed.

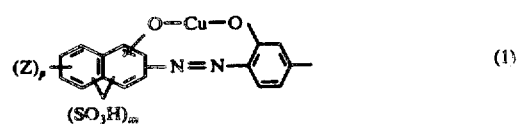

(1)

-continued

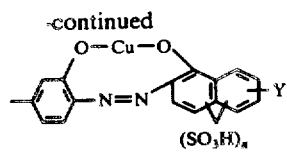

wherein Y is:

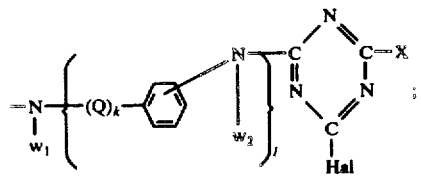

and Z is:

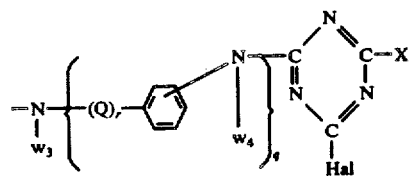

or —NHR wherein $w_1$, $w_2$, $w_3$, and $w_4$ represent hydrogen or methyl; Q represents —$SO_2$— or —CO—; $k$, $r$, $l$ and $q$ represent 1 or 0; R represents hydrogen; —$COCH_3$;

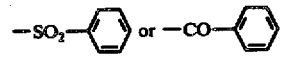

which may be substituted by methyl or chloro; phenyl which may be substituted by sulfo or carboxy; or —$CH_2CH_2OH$. Hal represents chloro or bromo. X represents amino; mono- or di-alkylamino having from 1 to 3 carbon atoms; mono- or di-hydroxyalkylamino having from 1 to 3 carbon atoms; anilino which may be substituted by a sulfo group, carboxy group, methyl, ethyl, nitro, methoxy, ethoxy, acetylamino, sulfamoyl, β-sulfatoethylsulfonyl, cyano, chloro, or bromo; N-methylanilino; carboxymethylamino; β-sulfoethylamino; N-(β-hydroxyethyl)-methylamino; naphthylamino which may be substituted by a sulfo group; morpholino; alkoxy having from 1 to 3 carbon atoms; or phenoxy which may be substituted by chloro, nitro, sulfo, or methyl, and $p$ is 0 or 1, $m$ is a whole number from 1 to 3 and $n$ is a whole number from 1 to 2. These dyestuffs are useful for dyeing of such materials as cellulosic fibers.

14 Claims, No Drawings

REACTIVE DISAZO MONOHALOGENOTRIAZINE DYESTUFFS

BACKGROUND OF THE INVENTION

1. Field of the Invention

This invention relates to disazo dyestuffs and the method for forming such materials.

2. Description of Prior Art

Various dyestuffs containing the monohalogenotriazine group have been known. Because of the presence of this reactive triazine group, they react easily with cellulose fibers, such reaction normally being carried out in the presence of an acid binding agent such as sodium carbonate. For example, in cases where the liquor-to-goods ratio is relatively great, these dyestuffs give fast and practical dyeing using the dip dyeing method in which fibers are treated in the dye bath at an elevated temperature, 60° to 90° C, in the presence of a salt and an acid binding agent. When these dyestuffs are employed for dyeing methods using smaller liquor-to-goods ratios, as, for instance, the pad dyeing method or the printing method, they can be satisfactorily fixed on cellulose fibers by short periods of steam heating or dry heating in the presence of an acid binding agent. In the case of these known dyestuffs having the monohalogenotriazine group, it is practically impossible to completely fix all of the absorbed dyestuff onto the cellulose fibers, and a considerable amount of non-fixed dyestuff is always present in the cellulose fibers immediately after dyeing. Accordingly, these dyed cellulose fibers exhibit very poor wet fastness, especially when measured by the fastness to washing test (JIS L-0844) or fastness to water test (JIS L-0846). (JIS = Japanese Industrial Standard.) It is necessary then, in order to attain a high wet fastness, to remove the non-fixed dyestuffs. Such removal is commonly carried out by treating the fabric with a suitable surface active agent in a hot soaping step. However, in practice, such treatment requires a long time, occupying many complicated steps in comparison to the relatively simple dyeing procedure. Therefore, it has been acknowledged that dyestuffs having the monohalogenotriazine group are commerically unsatisfactory in that the overall dyeing procedure cannot be performed efficiently. Thus, the development of triazine dyestuffs of this type which show excellent wet fastness without performing the abovementioned hot soaping steps has been greatly demanded in the art.

SUMMARY OF THE INVENTION

Accordingly, one object of the present invention is to provide a series of monohalogenotriazine dyestuffs that exhibit superior wet fastness on cellulosic fibers and do not require extensive amounts of hot soaping steps after the dyeing step.

Another object of the present invention is to provide a series of monohalogenotriazine dyestuffs that can be synthesized by the reaction of cyanuric chloride or bromide with a disazo compound and reacting the resulting product with an aromatic or aliphatic amine.

Another object of the present invention is to provide a series of monohalogenotriazine dyestuffs that can be synthesized by the reaction of an amino substituted triazine with a disazo compound.

Briefly, these objects and other objects of the present invention as hereinafter will become more readily apparent can be attained from the compound of the formula

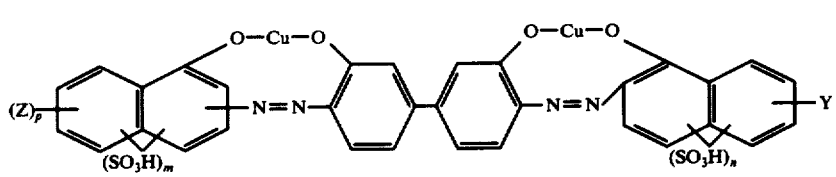

(1)

wherein Y stands for a group represented by the following formula

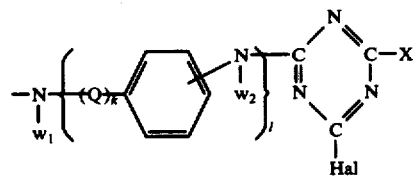

and Z stands for a group represented by the following formula

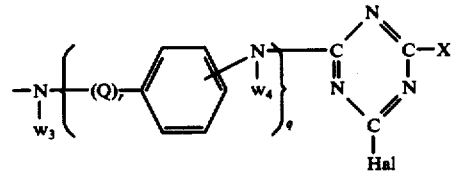

or —NHR, wherein $w_1$, $w_2$, $w_3$ and $w_4$ represent hydrogen or methyl; Q represents —SO$_2$— or —CO—; k, r, l and q represent 1 or 0. R represents hydrogen; —COCH$_3$;

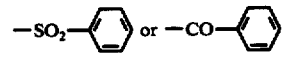

which may be substituted by methyl or chloro; phenyl which may be substituted by sulfo or carboxy; or —CH$_2$CH$_2$OH. Hal represents chloro or bromo. X represents amino; mono- or di-alkylamino having from 1 to 3 carbon atoms; mono- or di-hydroxyalkylamino having from 1 to 3 carbon atoms; anilino which may be substituted by sulfo, carboxy, methyl, ethyl, nitro, methoxy, ethoxy, acetylamino, sulfamoyl, β-sulfatoethylsulfonyl, cyano, chloro or bromo; N-methylanilino; carboxymethylamino; β-sulfoethylamino; N-(β-hydroxyethyl)-methylamino; naphthylamino which may be substituted by sulfo; morpholino; alkoxy having from 1 to 3 carbon atoms; or phenoxy which may be substituted by chloro, nitro, sulfo or methyl, and wherein p is 0 or 1, m is a whole number of from 1 to 3 and n is a whole number of from 1 to 2.

These compounds may be formed from the reaction of a triazine compound represented by formula (2)

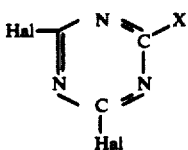

wherein Hal and X are defined as above, with a disazo compound represented by formula (3)

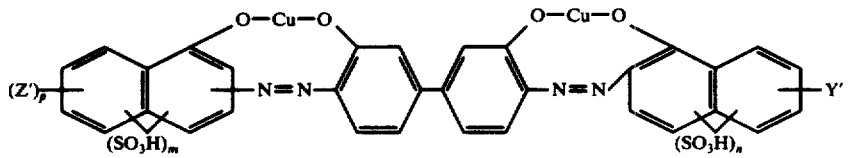

wherein Y' stands for a group represented by the following formula

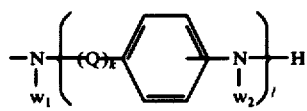

and Z' stands for a group represented by the following formula

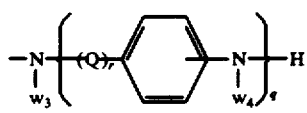

or —NHR, wherein $w_1$, $w_2$, $w_3$, $w_4$, Q, k, r, l, q, R, p, m and n are as defined above.

The dyestuffs of this invention may also be formed by condensing cyanuric chloride or cyanuric bromide with a disazo compound represented by formula (3) and reacting the resulting product with a compound of formula (4)

H-X  (4)

wherein X is defined as above.

DESCRIPTION OF THE PREFERRED EMBODIMENTS

Disazo compounds of formula (2) can be used for the synthesis of dyestuffs of this invention. These may be obtained by tetrazotizing o-dianisidine and coupling the tetrazotized compound with a suitable coupling component. Treating this product with a copper-yielding reagent according to known methods, for example, the method disclosed in the specification of British Patent No. 644,885, converts it to the copper complex. As the coupling component, there can preferably be employed, for example, 1-amino-8-naphthol-3,6-disulfonic acid, 1-amino-8-naphthol-2,4-disulfonic acid, 1-amino-8-naphthol-4,6-disulfonic acid, 2-amino-8-naphthol-3,6-disulfonic acid, 3-amino-8-naphthol-4,6-disulfonic acid, 2-amino-5-naphthol-7-sulfonic acid, 2-N-methylamino-5-naphthol-7-sulfonic acid, 2-N-methylamino-8-naphthol-6-sulfonic acid, 2-amino-8-naphthol-6-sulfonic acid, 1-amino-8-naphthol-4-sulfonic acid, 1-amino-5-naphthol-7-sulfonic acid, 1-(4'-methylbenzenesulfonylamino)-8-naphthol-3,6-disulfonic acid, 1-(4'-aminobenzenesulfonylamino)-8-naphthol-3,6-disulfonic acid, 1-benzenesulfonylamino-8-naphthol-3,6-disulfonic acid, 1-benzoylamino-8-naphthol-3,6-disulfonic acid, 1-(4'-aminobenzoylamino)-8-naphthol-3,6-disulfonic acid, 1-(3'-aminobenzoylamino)-8-naphthol-3,6-disulfonic acid, 1-(β-hydroxyethylamino)-8-naphthol-3,6-disulfonic acid, 1-acetylamino-8-naphthol-3,6-disulfonic acid, 2-(4'-amino-3'-sulfophenylamino)-5-naphthol-7-sulfonic acid, 2-phenylamino-5-naphthol-7-sulfonic acid, 2-phenylamino-8-naphthol-6-sulfonic acid, 3-acetylamino-8-naphthol-4,6-disulfonic acid, 1-acetylamino-8-naphthol-4,6-disulfonic acid, 2-(4'-amino-3'-sulfophenylamino)-8-naphthol-6-sulfonic acid, 1-naphthol-4-sulfonic acid, 1-naphthol-3,6-disulfonic acid, 1-naphthol-3,8-disulfonic acid, 1-naphthol-3,6,8-trisulfonic acid, 2-naphthol-6-sulfonic acid, 2-naphthol-8-sulfonic acid, 2-naphthol-3,6-disulfonic acid, 2-naphthol-6,8-disulfonic acid, 2-(3'-sulfophenylamino)-8-naphthol-6-sulfonic acid and 2-(4'-aminophenylamino)-8-naphthol-6-sulfonic acid. The coupling components that can be used are not limited to those exemplified above.

The condensation of compounds of formula (4) with the reaction product formed by the reaction of cyanuric chloride or cyanuric bromide with the above-mentioned disazo compound of general formula (3) is conducted at a temperature of 20° to 60° C using the amine in excess or adjusting the pH to 4.0 to 8.5 by addition of an acid binding agent such as sodium carbonate or sodium bicarbonate. As compounds of formula (4), there can be mentioned, for example, ammonia; substituted and unsubstituted alkylamines such as methylamine, ethylamine, diethylamine, dimethylamine, glycine, sarcosine and taurine; substituted and unsubstituted anilines such as aniline, aniline-2-sulfonic acid, aniline-3-sulfonic acid, aniline-4-sulfonic acid, 4-sulfoanthranilic acid, 5-sulfoanthranilic acid, p-toluidine-3-sulfonic acid, aniline-2,5-disulfonic acid, 2-methoxyaniline-4-sulfonic acid and 2-chloroaniline-4-sulfonic acid; alkanolamines such as monoethanolamine, diethanolamine and N-methylethanolamine; aminonaphthalene-sulfonic acids such as 1-aminonaphthalene-4-sulfonic acid, 1-aminonaphthalene-3,6-disulfonic acid, 1-aminonaphthalene-7-sulfonic acid, 1-aminonaphthalene-4,6,8-trisulfonic acid, 2-aminonaphthalene-7-sulfonic acid, 2-aminonaphthalene-5,7-disulfonic acid and 2-aminonaphthalene-4,8-disulfonic acid; morpholine; phenols such as phenol, o-, m- and p-chlorophenols, o-, m- and p-nitrophenols, o-, m- and p-sulfophenols, o-, m- and p-cresols, and the like.

A triazine compound of the general formula (2) can be obtained by condensing cyanuric chloride or cyanuric bromide with an equimolar amount of a compound of formula (4), preferably at a temperature of 0° to 10° C. As triazine compounds of the general formula (2), there can be mentioned, for example, 2-methoxy-4,6-dichlorotriazine, 2-ethoxy-4,6-dichlorotriazine, 2-propoxy-4,6-dichlorotriazine, 2-iso-propoxy-4,6- dichlorotriazine, 2-amino-4,6-dichlorotriazine, 2-alkylamino-4,6-dichlorotriazine, 2-$\beta$-hydroxyethylamino-4,6-dichlorotriazine, 2-dialkylamino-4,6-dichlorotriazine, 2-$\beta$-sulfoethylamino-4,6-dichlorotriazine, 2-sulfoanilino-4,6-dichlorotriazine, 2-sulfoanthranyl-4,6-dichlorotriazine, 2-morpholino-4,6-dichlorotriazine, 2-carboxymethylamino-4,6-dichlorotriazine and 2-sulfonaphthylamino-4,6-dichlorotriazine. The condensation of such triazine compounds with the amino group of disazo compounds of formula (3) is carried out at a temperature of 20° to 60° C with the pH adjusted to within a range of 2.0 to 8.5 by addition of an acid binding agent.

Among the reactive disazo dyestuffs of this invention, there are preferred compounds of formula (1) in which Y, Z, R, m, n, p, w, $w_3$, Hal and X are as defined above, but in which $l$ and $q$ are 0, and where the naphthalene radical containing the substituent $(Z)_p$ is bonded to —O—Cu—O— at the 1-position and to the azo group-containing phenylene radical at the 2-position. Especially preferred are those of formula (1) in which Y, Z, R, m, p and $w_3$ are as defined above but $l$ and $q$ are 0, n is 2, and $w_1$ is a hydrogen atom and where the naphthalene radical containing the substituent $(Z)_p$ is bonded to the —O—Cu—O— at the 1-position and to the azo group-containing phenylene radical at the 2-position. The naphthalene radical containing the substituent Y is bonded to Y at the 8-position, to the sulfonic acid groups at the 3- and 6-positions, and the —O—Cu—O— is bonded at the 1-position. The azo group-containing phenylene radical is bonded to —O—Cu—O— at the 2-position.

The novel reactive disazo dyestuffs of this invention are suitable for dyeing fibrous products of cellulose fibers and mixed spun fibrous products containing cellulose fibers. More specifically, these fibrous products are dyed with these novel dyestuffs according to the dip dyeing, printing and pad dyeing methods which are conducted in the presence of an acid binding agent.

As the acid binding agent to be used for dyeing, there can be mentioned, for example, sodium hydrogencarbonate, sodium metaphosphate, trisodium phosphate, sodium orthosilicate, sodium metasilicate, sodium carbonate and sodium hydroxide.

In case the dyestuffs of this invention are to be used in a dyeing treatment in which a relatively greater liquor-to-goods ratio is employed, i.e., the batchwise dip dyeing method, a dye bath is used employing a salt, such as sodium chloride and sodium sulfate with the dyestuffs. Fibers are dyed in this dye bath at 30° to 100° C for 10 to 60 minutes. An acid binding agent is then added, and the fibers are further treated at 60° to 100° C for 20 to 60 minutes. The acid binding agent may be added to the dye bath at the beginning of the dyeing procedure. It is also possible to employ a method in which fibers are first dyed under neutral conditions and the absorbed dyestuff is then fixed by using subsequent baths containing the acid binding agent.

When dyestuffs of this invention are used in a dyeing treatment employing a relatively lower liquor-to-goods ratio, i.e., the continuous or semi-continuous dyeing method, the dye bath is normally prepared using a dye, an acid binding agent, a penetrant and, if desired, urea. Fibers are dipped in this bath for a short time, squeezed, and allowed to stand at room temperature or at elevated temperatures or may be subjected to a steam heating or dry heating treatment for a short time. In some cases, it is possible to utilize a method in which fibers are first dipped in a solution of the acid binding agent and then padded with a neutral dye bath. It is also possible to employ a method in which fibers are first padded with a neutral dye bath, treated with a solution of the acid binding agent saturated with an inorganic salt, and allowed to stand or subjected to a heat treatment.

When dyestuffs of this invention are to be used in a printing treatment, the fibers are generally treated during printing with a colour paste formed by incorporating a dyestuff, an acid binding agent, urea and the like into a stock paste such as sodium alginate or an emulsion paste. The printed fibers are then subjected to an intermediate drying and heat treatment or are allowed to stand at room temperature or heated to fix the absorbed dyestuff. If necessary, it is also possible to use a method in which fibers are first immersed in a solution of the acid binding agent printed with a neutral colour paste and then allowed to stand or subjected to a heat treatment.

Fibers dyed by the dip dyeing the pad dyeing method or the printing method, such as mentioned above, are rinsed lightly with water and then treated with a commercially available fixing agent for anionic dyestuffs, preferably a fixing agent of the polyethylene-polyamine type. It is also possible to subject the dyed fibers to the fixing treatment directly without performing light rinsing.

When dyestuffs of this invention are used for dyeing of cotton, even if the dyeing is conducted at a dye concentration higher than the standard depth of shade (JIS L-0808), it is only necessary to perform the fixing treatment using a commercially available fixing agent. It is not necessary to carry out the hot fastness, step commonly used after dyeing, since the high wet fasteness, i.e., a rating grade 4 or higher of staining on cotton in the fastness to washing test (JIS L-0844-1970 Method A-4), can be readily attained. Such high wet fastness is characteristic of the reactive disazo dyestuffs of this invention. Further, the dyestuffs of this invention can provide deep blue dyeing excellent in light fastness, chlorine fastness and color yield.

Having generally described the invention, a more complete understanding can be obtained by reference to certain specific examples, which are included for purposes of illustration only and are not intended to be limiting unless otherwise specified. All of the structural formulae show dyestuffs of the free acid form, and all "parts" and "%" are by weight.

EXAMPLE 1

20 parts of a disazo compound represented by the following formula (5)

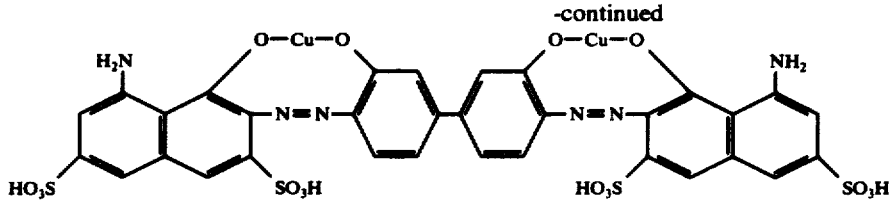
-continued was added to 300 parts of water, and the mixture was agitated. A solution of 9.4 parts of 2-carboxymethylamino-4,6-dichlorotriazine in 200 parts of water was added to the mixture, and the resulting mixture was maintained at 45° C. The reaction was carried out while controlling the pH to 7.5 to 8.0 by addition of a 10% solution of soda ash. After completion of the reaction was confirmed, salting-out was carried out by adding sodium chloride to the reaction mixture. The precipitate was recovered by filtration and dried at a temperature below 80° C. The so-formed dyestuff was found to have a structure represented by structural formula (6). This compound was observed to dye cellulose fibers a deep blue color.

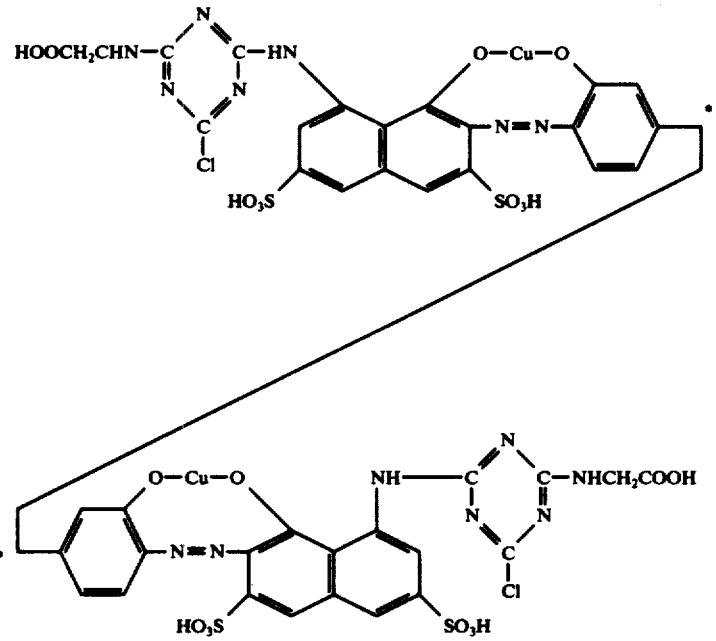

(6)

The procedure of Example 1 was repeated, except that 8.5 parts of 2-(2,5-disulfoanilino)-4,6-dichlorotriazine was used instead of 9.4 parts of 2-carboxymethylamino-4,6-dichlorotriazine. As a result, a dyestuff having the structure represented by structural formula (7) was obtained. The compound was observed to dye cellulose fibers to a deep blue color.

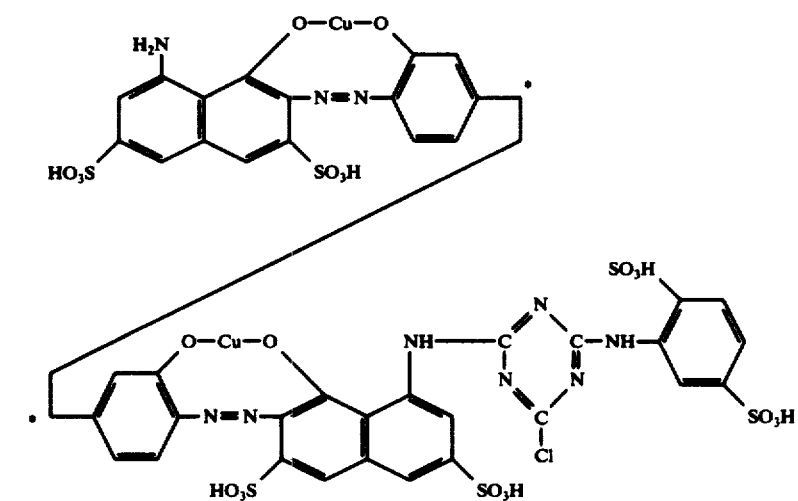

(7)

The disazo compound represented by formula (5) was formed by tetrazotizing o-dianisidine, coupling one mole of the tetrazotized compound with 2 moles of 1-amino-8-naphthol-3,6-disulfonic acid and treating the product with copper ammonium sulfate in the presence of ethanolamine thereby converting it to the copper complex.

EXAMPLE 2

10.5 parts of the disazo compound represented by formula (8)

parts of a cotton hosiery was immersed in this dye bath at 90° C and treated for 30 minutes. 20 parts of sodium carbonate was then added to the dye bath and the dyeing was further conducted for subsequent 60 minutes. Then, the dyed hosiery was rinsed lightly with water and treated at 60° C for 20 minutes in another bath prepared by using 3 parts of San Fix 555 (fixing agent of the polyamine type manufactured by Sanyo Kasei Kogyo K.K.) with 1000 parts of water. This treatment was followed by rinsing and drying. As a result, there was obtained a dyed hosiery material of deep blue color (8)

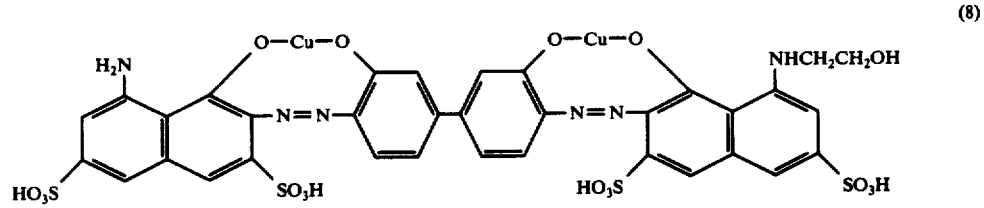

was dissolved in 300 parts of water and neutralized with soda ash. A solution of 3.4 parts of 2-(3-sulfoanilino)-4,6-dichlorotriazine in 100 parts of water was added to the above solution. The reaction was carried out while maintaining the mixture at 45° C and controlling the pH to 7.5 to 8.0 by addition of a solution of soda ash. After completion of the reaction was confirmed, salting-out was carried out by adding sodium chloride to the reaction mixture. The precipitate was recovered by filtration and dried at a temperature below 80° C.

The dye obtained from the above reaction was found to have a structure represented by formula (9). These dyes were observed to dye cellulose fibers into a deep blue color.

excellent in various fastness characteristics, especially in wet fastness. More specifically, the dyed hosiery material exhibited a rating of 4 or higher of staining on cotton in the fastness to washing test (JIS L-0844-1970 Method A-4).

EXAMPLE 4

Spun rayon fibers (50 parts) were immersed at 30° C in a dye bath prepared by using 2 parts of a dyestuff represented by formula (9), 1 part of Liponox RNA (non-ionic penetrant manufactured by Lion Yushi K.K.), 40 parts of sodium chloride and 1000 parts of water for 30 minutes. 2 parts of sodium hydroxide was added to the dye bath and the temperature elevated to (9)

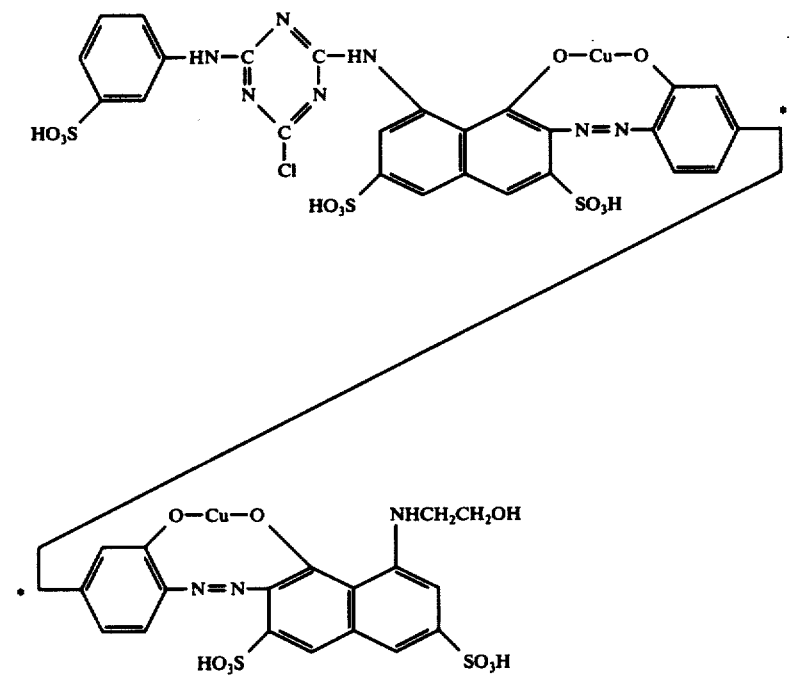

EXAMPLE 3

A dye bath was prepared by using 3 parts of the dyestuff represented by structural formula (6), with 80 parts of anhydrous sodium sulfate and 1000 parts of water. 25

95° C over a period of 20 minutes. At this temperature, the dyeing was further continued for 40 minutes. Without performing rinsing, the fibers were squeezed to remove the liquid therefrom, and the fibers were treated with another bath prepared by using 2 parts of Thioset K (fixing agent of the polyamine type manufactured by Asahi Senryo K.K.) and 1000 parts of water at 60° C for 20 minutes. This was followed by rinsing and drying. The so dyed fibers of a deep blue color were excellent in various fastness characteristics, especially in the wet fastness. More specifically, the dyed fibers exhibited a rating of 4 or higher of staining on cotton in the fastness to washing test (JIS L-0844-1970 Method A-4).

EXAMPLE 5

A cotton cloth was padded by passing it through a solution formed by dissolving 20 parts of the dyestuff represented by formula (7) and 200 parts of urea in 740 parts of water and adding 20 parts of a stock paste containing 10% sodium alginate and 20 parts sodium carbonate. The so-treated cotton cloth was squeezed until it was twice the weight of the original undyed cloth. After an intermediate drying treatment, the cotton cloth was heat-treated at 160° C for 2 minutes, and was then rinsed lightly with water and treated at 60° C for 20 minutes in a bath prepared by using 2 parts of Sprafix WF NEW (fixing agent of the polyamine type manufactured by Nippon Senka K.K.) and 1000 parts by water. This was followed by rinsing and drying. As a result, there was obtained a blue dyed cloth excellent in various fastness characteristics, especially in the wet fastness. More specifically, the dyed cloth exhibited a rating of 4 or higher of staining on cotton in the fastness to washing test (JIS L-0844-1970 Method A-4). Similar results were obtained where the fixing treatment was performed by padding the dyed cloth by passing it through a solution formed from 20 parts of the fixing agent and 1000 parts of water followed by squeezing the cloth to twice the weight of the original cloth and then heat-treating at 100° C for 2 minutes.

EXAMPLE 6

20 parts of the dye of formula (10)

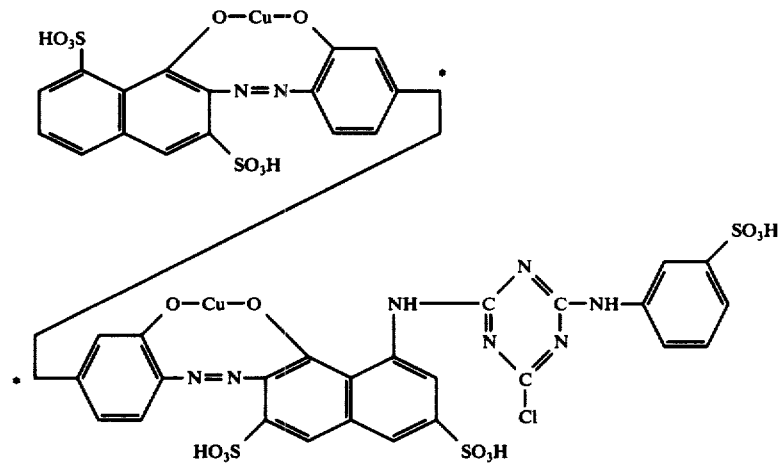

(10)

2 parts of Liponox OCS (non-ionic penetrant manufactured by Lion Yushi K.K.), 20 parts of sodium carbonate and 200 parts of urea were dissolved in 505 parts of water, and 250 parts of a 10% aqueous solution of sodium alginate was added to the above solution. The mixture was agitated so as to form a colour paste. The so formed paste was printed on a cotton cloth, and the printed cloth was subjected to an intermediate drying step. This was followed by a steam treatment at 102° C for 20 minutes. Then, and as described in Example 5, the cloth was rinsed with water, subjected to the fixing treatment, rinsed with water again, and dried. As a result, there was obtained a blue dyed cotton cloth excellent in various fastness characteristics, especially in the wet fastness. More specifically, the dyed cloth exhibited a rating 4 or higher of staining on cotton in the fastness to washing test (JIS L-0844-1970 Method A-4).

EXAMPLES 7 to 16

Dyed or printed materials of a deep blue color of similar excellent wet fastness characteristics as displayed in the dyed or printed materials obtained in Examples 3 to 6 were obtained when dyeing was conducted by the methods described in Examples 3 to 6 but employing dyestuffs having the structural formulas of 7 – 16. These dyestuffs could be prepared according to the same methods as described in Examples 1 and 2.

| Example No. | Structural Formula Expressed as Free Acid |
|---|---|
| 7 | 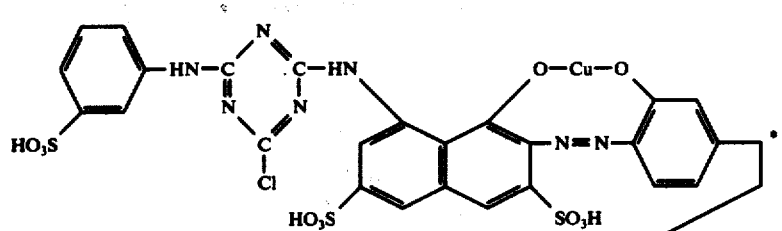 |
| 8 | 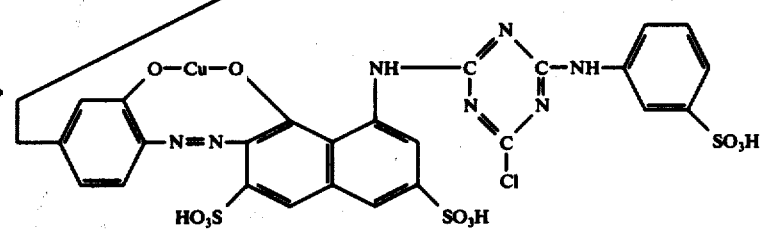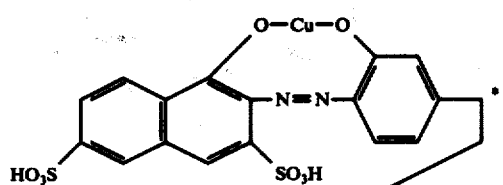 |
| 9 | 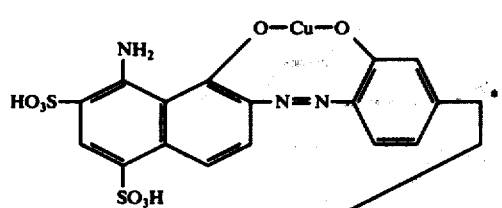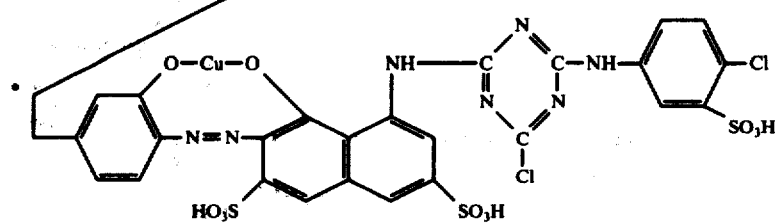 |

| Example No. | Structural Formula Expressed as Free Acid |
|---|---|
| 10 | 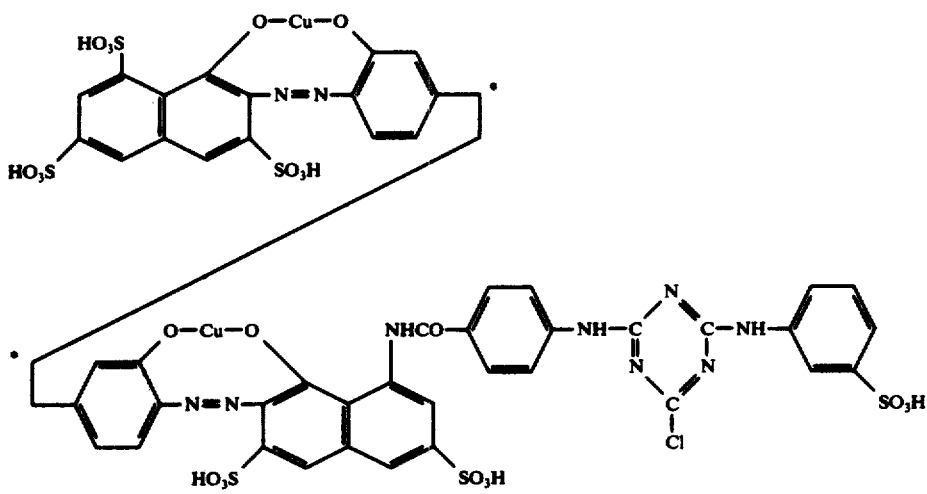 |
| 11 | 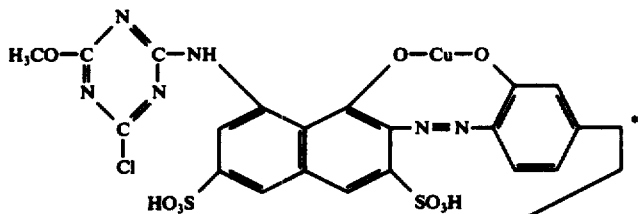 |
| 12 | 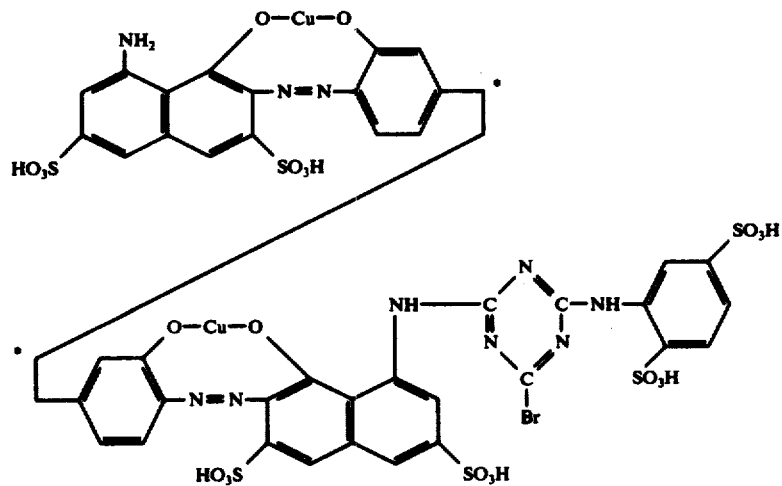 |

| Example No. | Structural Formula Expressed as Free Acid |
|---|---|
| 13 | (chemical structure) |
| 14 | (chemical structure) |
| 15 | (chemical structure) |

| Example No. | Structural Formula Expressed as Free Acid |
|---|---|
| 16 | 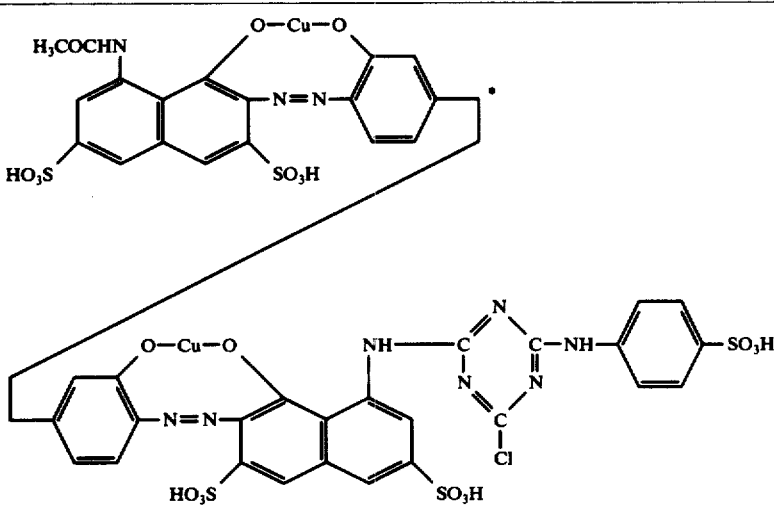 |

EXAMPLE 17

30 parts of a disazo compound represented by formula (5) was dissolved in 500 parts of water and ice was added to the solution to maintain it at 0° to 5° C. Then, 0.5 part of a dispersing agent was added to the solution with agitation, and 11.5 parts of cyanuric chloride was added to the resulting solution.

The reaction mixture was neutralized by addition of a 10% solution of soda ash to maintain the pH at 6.5 to 7.0. At this pH, the reaction was carried out at 0° to 5° C for 4 hours. After completion of the reaction was confirmed, 9 parts of taurine was added to the reaction mixture. The temperature was kept at 50° C, and the reaction was carried out while controlling the pH to 7.0 to 7.5 by using a 10% solution of soda ash. The reaction was completed in about 7 hours. Salting-out was carried out by adding sodium chloride to the reaction mixture. The precipitate was recovered by filtration and dried at a temperature below 80° C. The so obtained dye was found to have the structural formula (11) and could dye cellulose fibers to a deep blue color.

The procedures of Example 17 were repeated, except that 5.5 parts of ethanolamine or 9.5 parts of diethanolamine, respectively, were used instead of 9 parts of tauraine, to obtain dyestuffs having the structures represented by formulas (12) and (13), respectively. These dyestuffs were capable of dyeing cellulose fibers to a deep blue color similar to the dyestuff of formula (11).

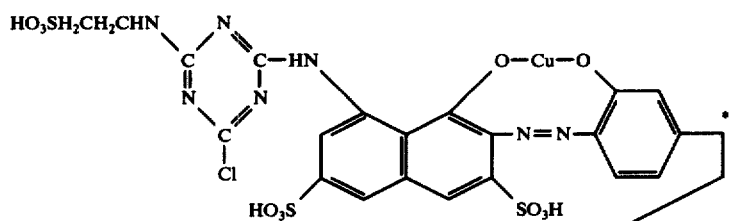

(11)

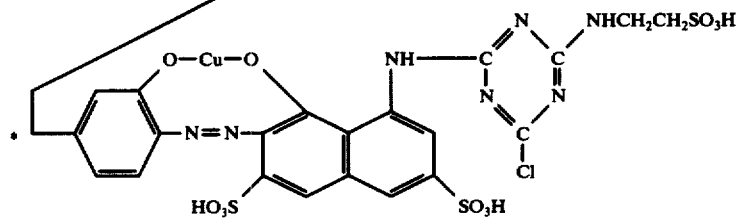

(12)

-continued

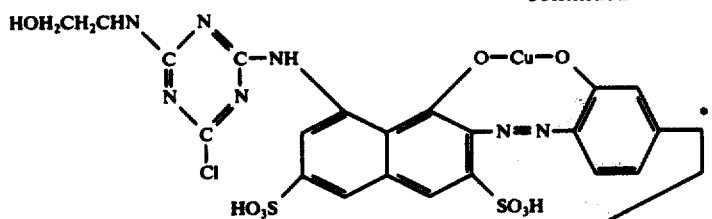

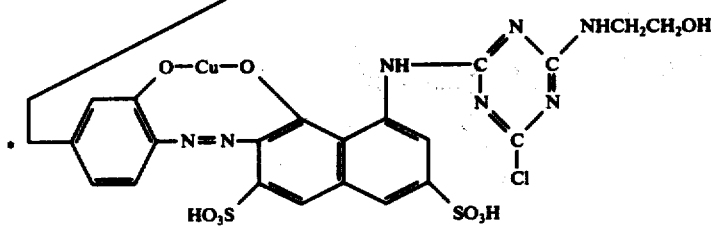

(13)

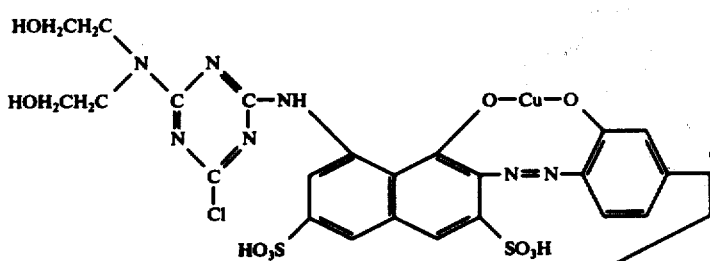

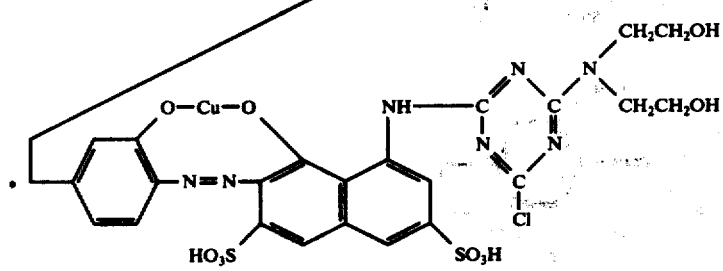

60

EXAMPLES 18 to 35

When dyestuffs of the following structural formula were used in the dyeing methods described in Examples 3 to 6, dyed or printed materials of a deep blue color, similarly excellent in wet fastness characteristics as those displayed in the dyed or printed materials of the preceding Examples were obtained. In each of the so obtained dyed and printed materials, the color tone was blue. These dyes were prepared according to the method described in Example 17.

| Example No. | Structural Formula Expressed as Free Acid |
|---|---|
| 18 | 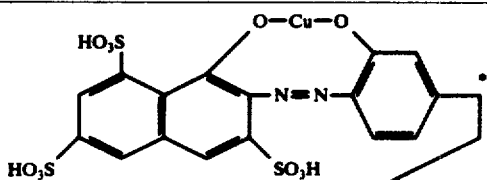 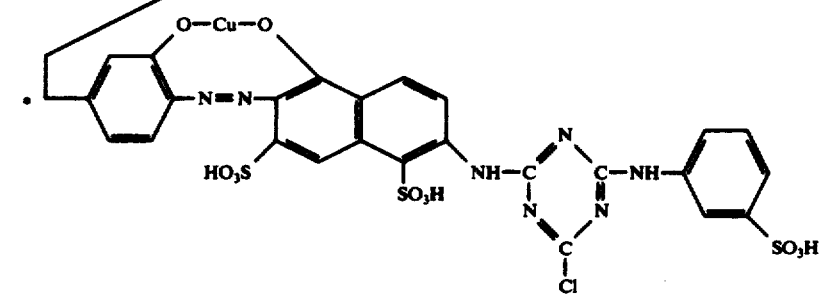 |
| 19 | 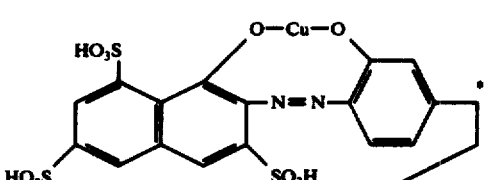 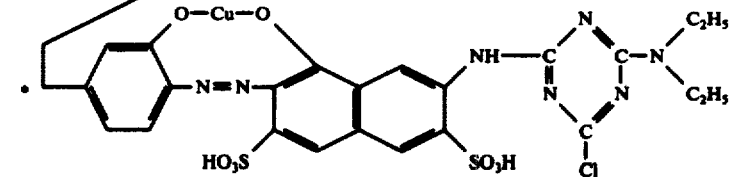 |
| 20 | 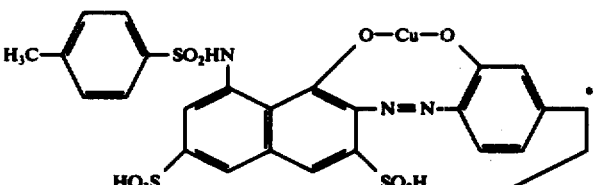 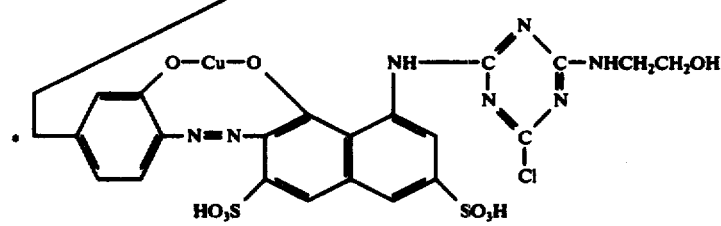 |

| Example No. | Structural Formula Expressed as Free Acid |
|---|---|
| 21 | 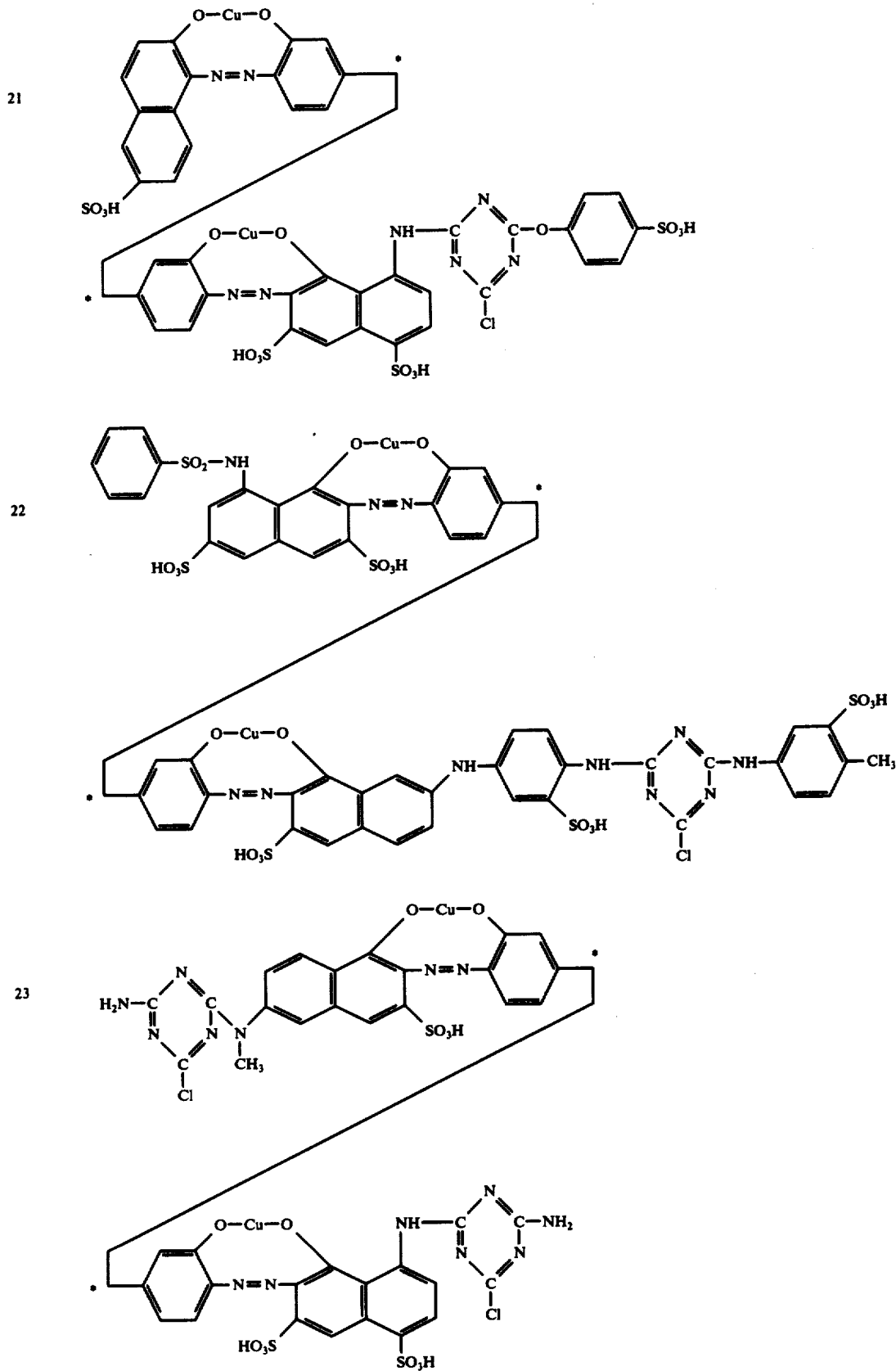 |
| 22 | |
| 23 | |

| Example No. | Structural Formula Expressed as Free Acid |
|---|---|
| 24 | 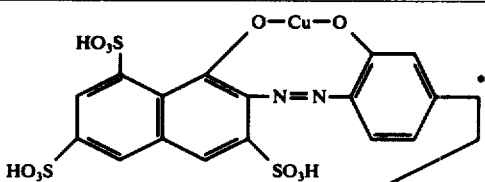 |
| 25 | 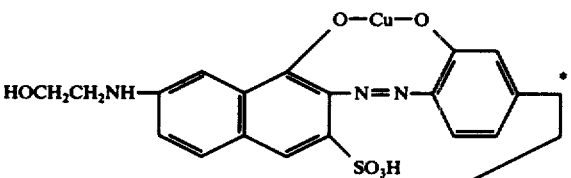 |
| 26 | 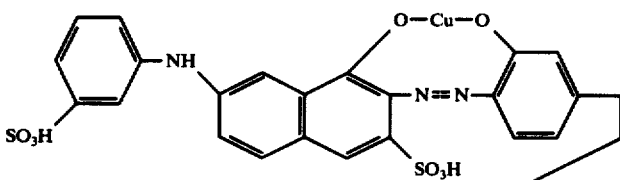 |
| | 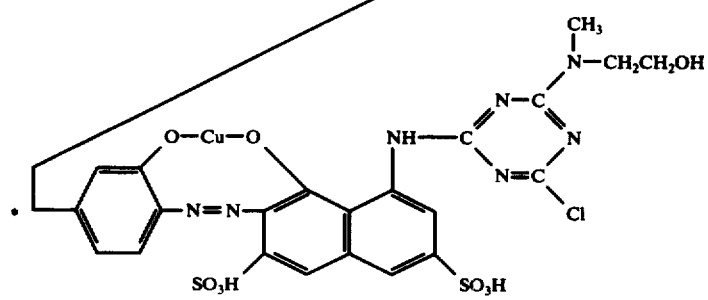 |

-continued
| Example No. | Structural Formula Expressed as Free Acid |
|---|---|
| 27 | 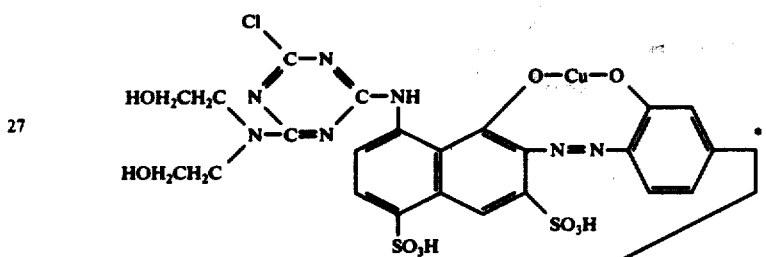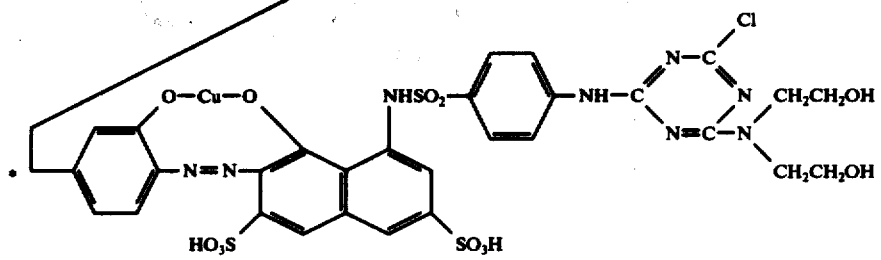 |
| 28 | 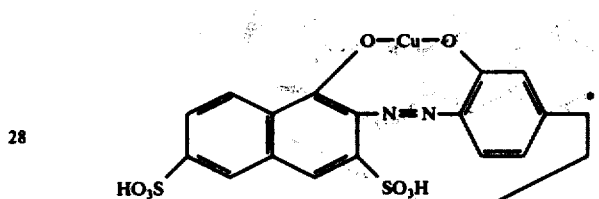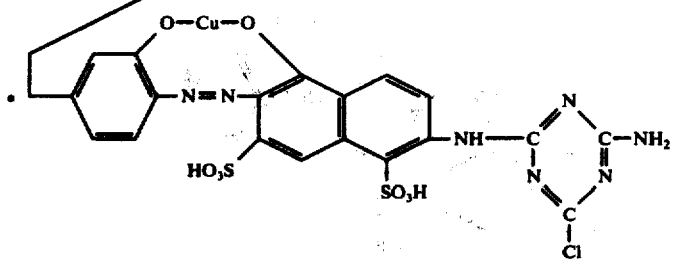 |

-continued
| Example No. | Structural Formula Expressed as Free Acid |
|---|---|
| 29 | 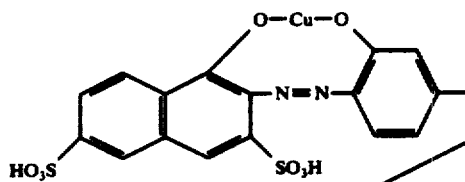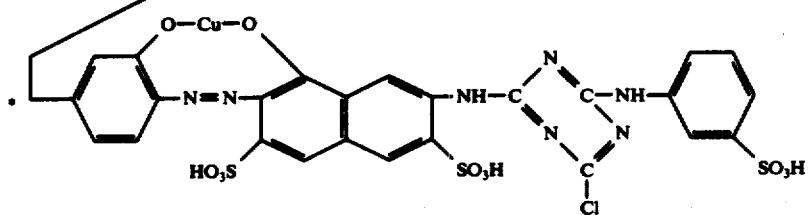 |
| 30 | 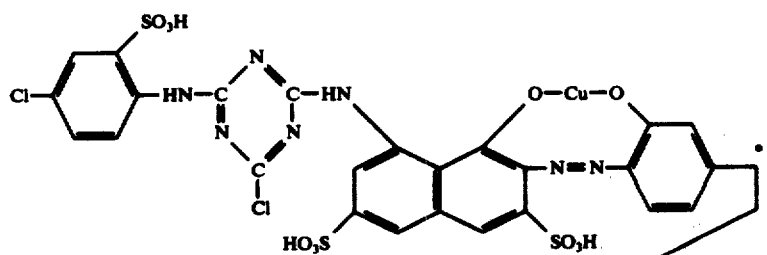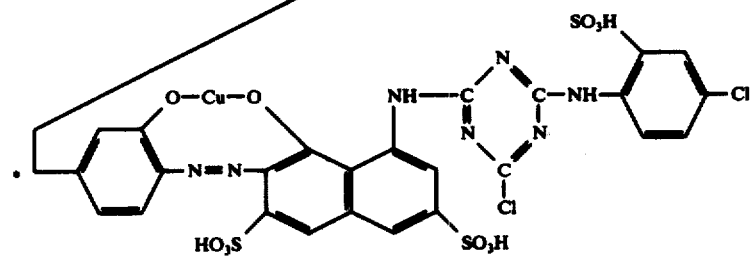 |

-continued
| Example No. | Structural Formula Expressed as Free Acid |
|---|---|
| 31 | 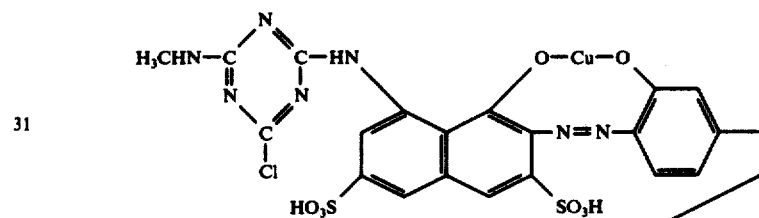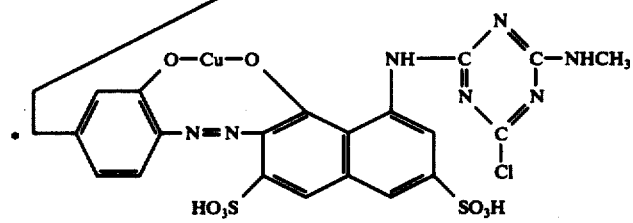 |
| 32 | 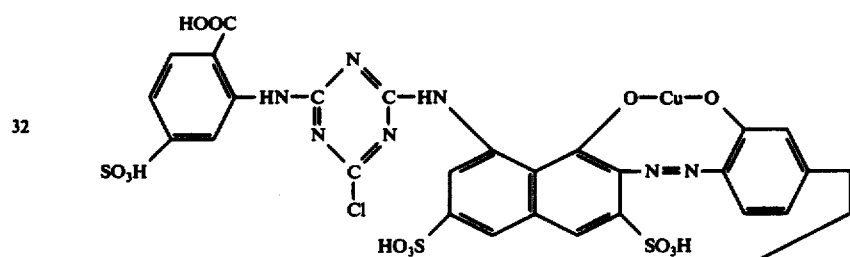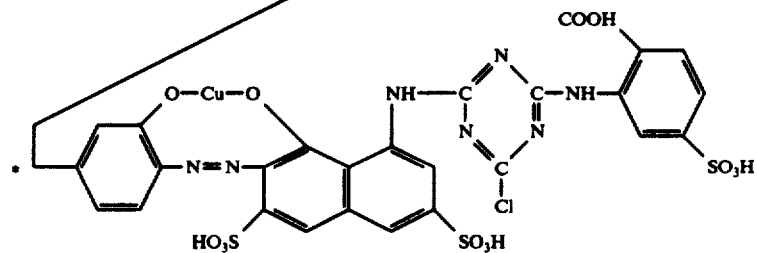 |

-continued
| Example No. | Structural Formula Expressed as Free Acid |
|---|---|
| 33 | 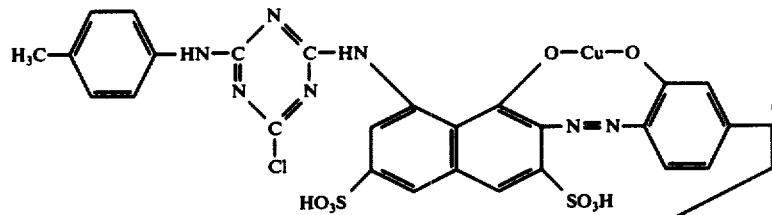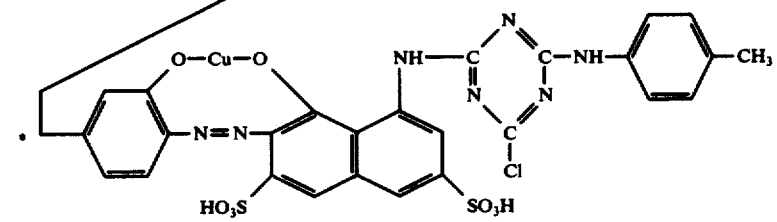 |
| 34 | 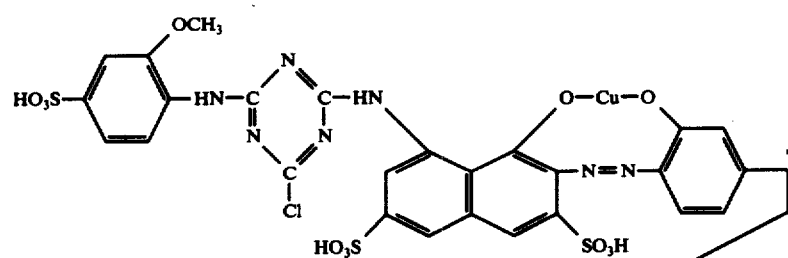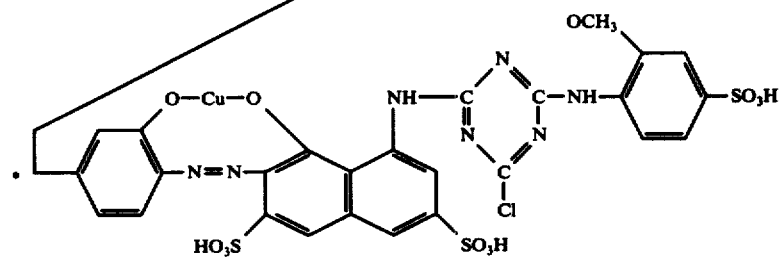 |

| Example No. | Structural Formula Expressed as Free Acid |
|---|---|
| 35 | 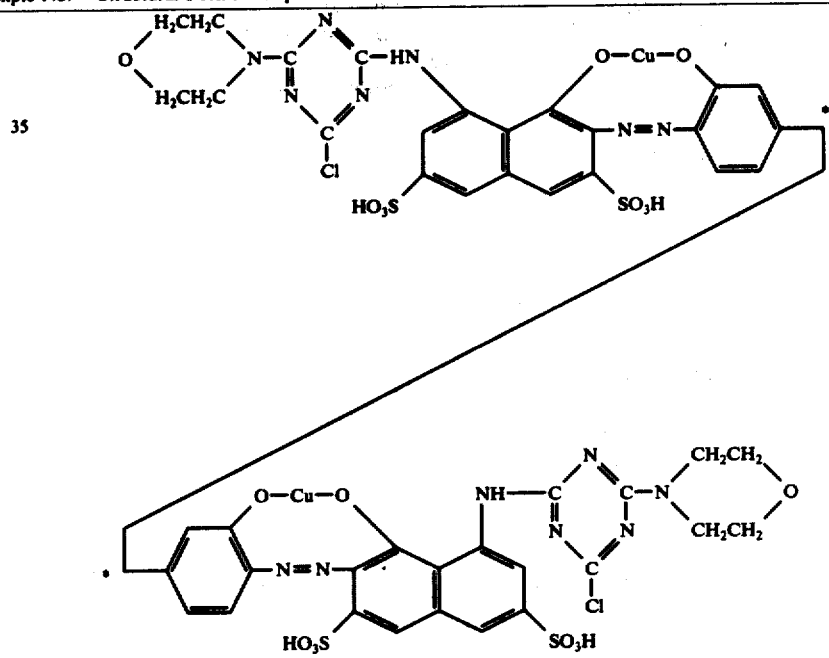 |

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. A compound of the formula (1):

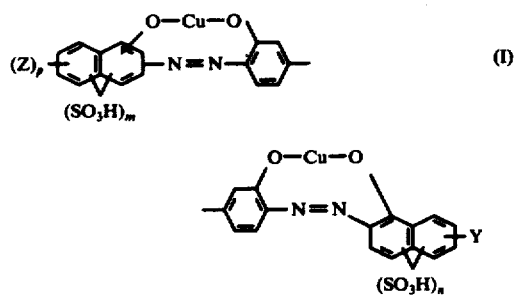

wherein Y is

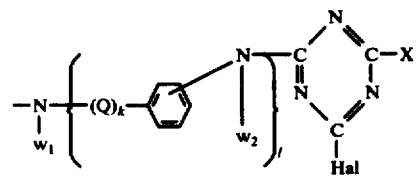

and Z is selected from the group consisting of

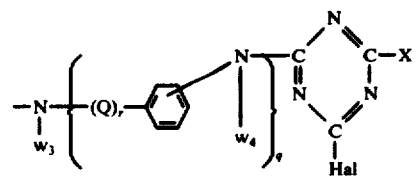

and —NHR wherein $w_1$, $w_2$, $w_3$ and $w_4$ represent hydrogen or methyl; Q represents —$SO_2$— or —CO—; $k$, $r$, $l$ and $q$ reprsent 1 or 0; R is selected from the group consisting of hydrogen, —$COCH_3$, —$COCH_3$, —$SO_2$—⟨phenyl⟩, —CO—⟨phenyl⟩, methyl or chloro substituted derivatives of —$SO_2$—⟨phenyl⟩ or —CO—⟨phenyl⟩, phenyl, sulfo or carboxy substituted derivatives of phenyl and —$CH_2CH_2OH$; Hal is selected from the group consisting of chloro and bromo; X is selected from the group consisting of $NH_2$; mono- or di-alkylamino having from 1 to 3 carbon atoms; mono- or di-hydroxyalkyl-amino having from 1 to 3 carbon atoms; anilino; sulfo-, carboxy-, methyl-, ethyl-, nitro-, methoxy-, ethoxy-, acetylamino-, sulfamoyl-, $\beta$-sulfato-ethylsulfonyl-, cyano-, chloro-, or bromo- substituted derivatives of anilino; N-methylanilino; carboxymethylamino; $\beta$-sulfoethylamino; N-($\beta$-hydroxyethyl) methylamino; naphthylamino; sulfo substituted derivatives of naphthylamino; morpholino; alkoxy having from 1 to 3 carbon atoms; phenoxy; and chloro-, nitro-, sulfo-, or methyl- substituted derivatives of phenoxy; $p$ is 0 or 1; $m$ is a whole number of from 1 to 3; and $n$ is a whole number of from 1 to 2.

2. A compound as set forth in claim 1, wherein $l$ and $l$ are 0, and the $(Z)_p$-substituted naphthalene radical is bonded to —O—Cu—O— at the 1-position and to the azo group-containing phenylene radical at the 2-position.

3. A compound as set forth in claim 1, wherein $l$ and $q$ are 0, $n$ is 2, $w_1$ is hydrogen, the $(Z)_p$-substituted naphthalene radical is bonded to —O—Cu—O at the 1-position and to the azo group-containing phenylene radical at the 2-position, Y is substituted at the 8-position of the naphthalene radical, sulfonic acid groups are substituted at the 3- and 6-positions of the (Z)$_p$-substituted and Y-substituted naphthalene radicals, and —O—Cu—O is substituted at the 1-position of the Y-substituted naphthalene radical and to the azo group-containing phenylene radical at the 2-position.

4. A compound of the formula:

wherein X' stands for di-(β-hydroxyethyl)amino, methylamino, β-hydroxyethylamino, anilino substituted by sulfo or methyl carboxyl, chloro or methoxy; carboxymethyl amino; β-sulfoethylamino; morpholino; or methoxy.

5. A compound of the formula:

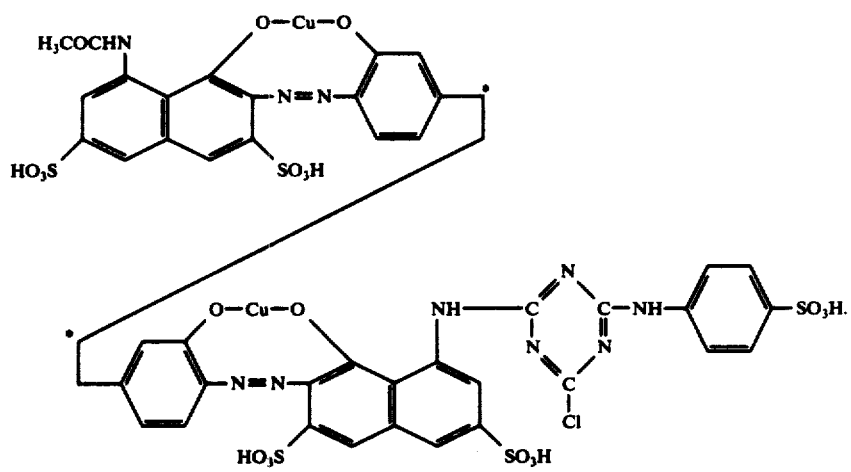

6. A compound of the formula:

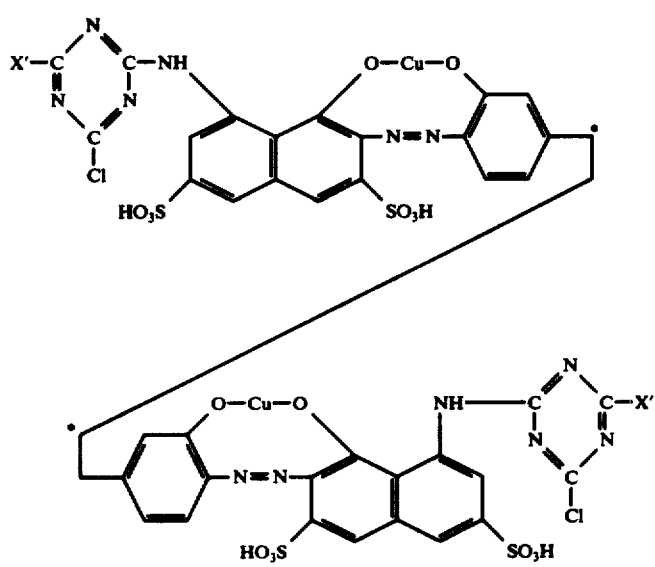

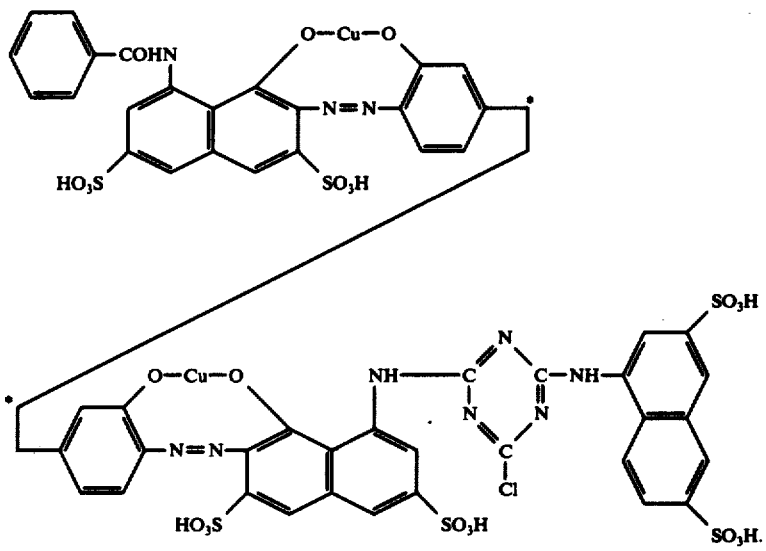
7. A compound of the formula:
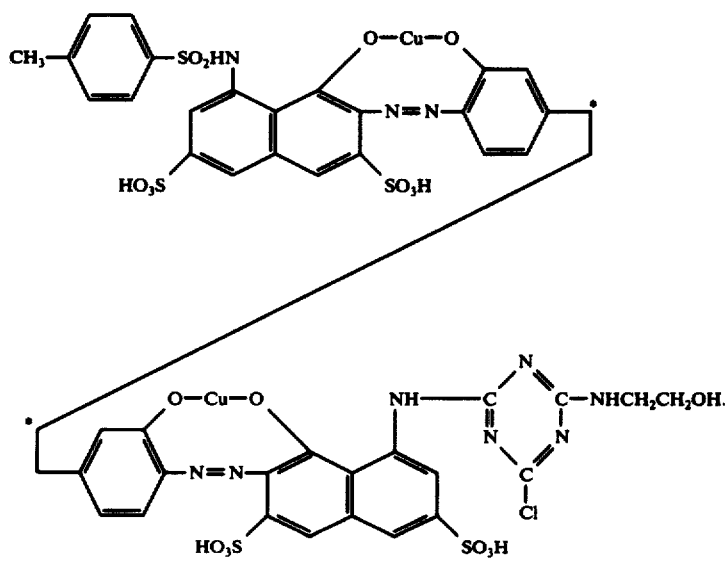
8. A compound of the formula:

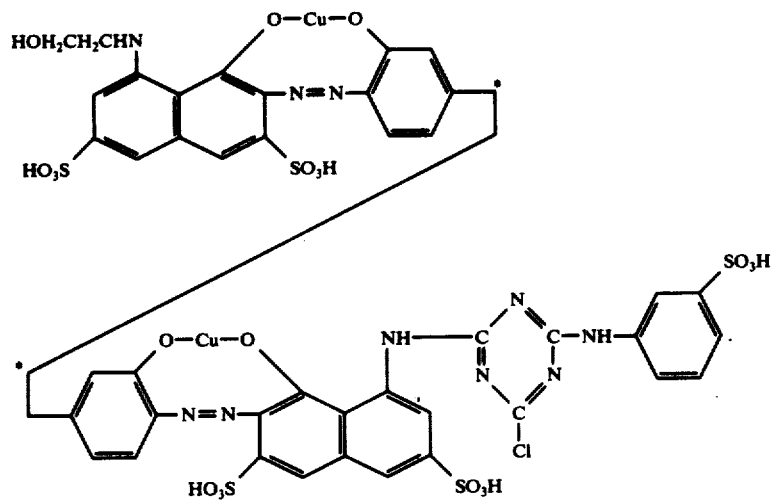
9. A compound of the formula:
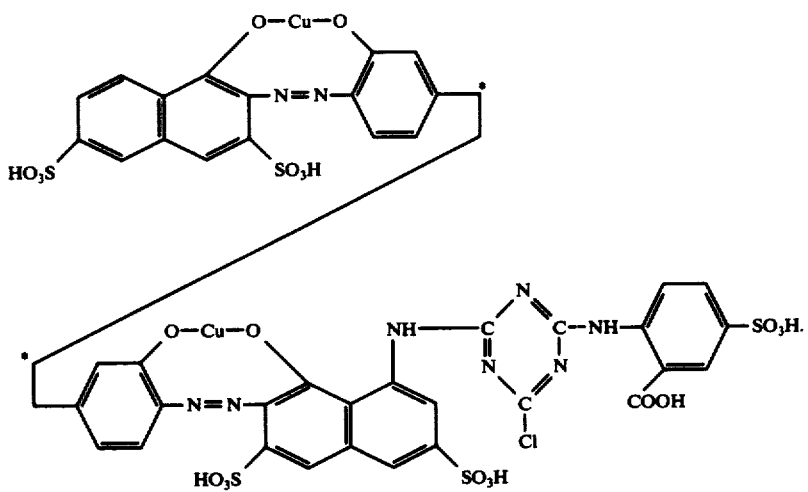
10. A compound of the formula:
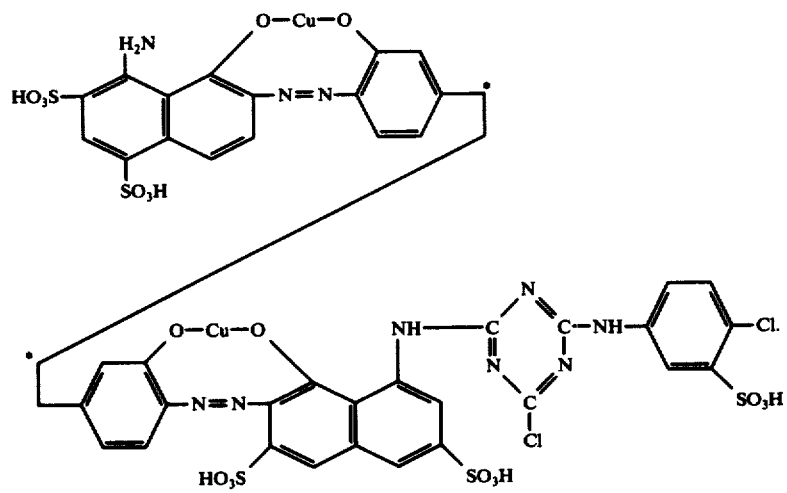
11. A compound of the formula:

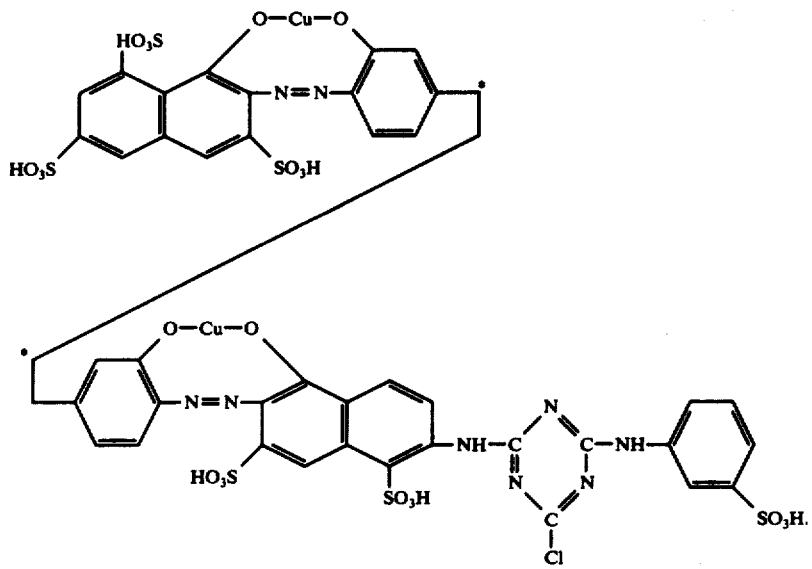
12. A compound of the formula:
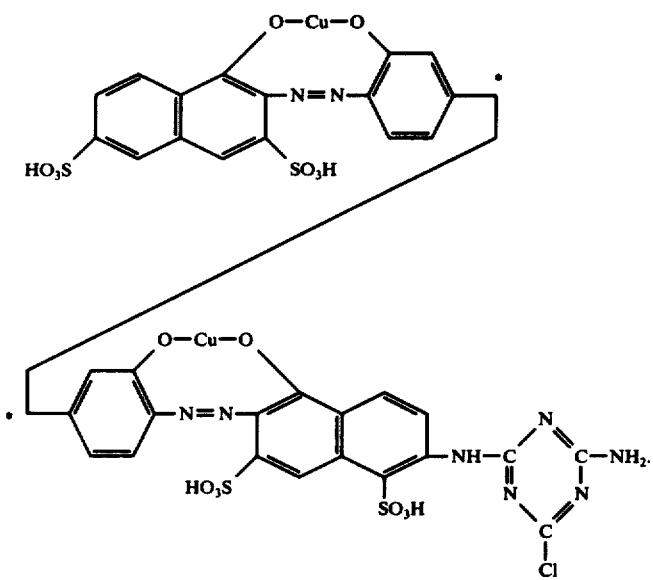
13. A compound of the formula:

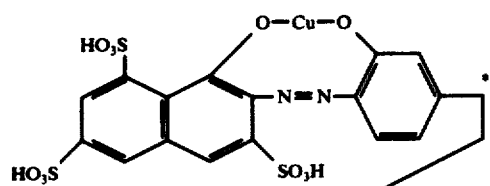
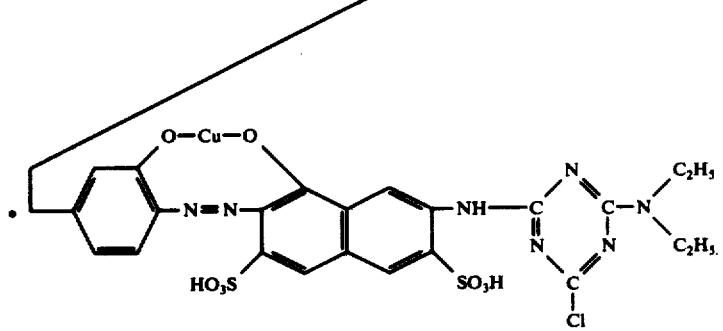
14. A compound of the formula:
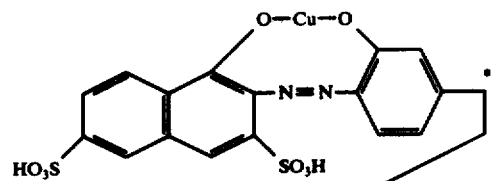
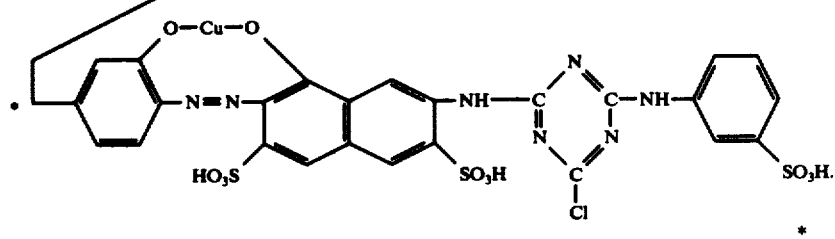
* * * * *